United States Patent
Williams et al.

(10) Patent No.: US 9,429,074 B2
(45) Date of Patent: Aug. 30, 2016

(54) AERODYNAMIC SWEPT VANES FOR FUEL INJECTORS

(75) Inventors: Brandon Phillip Williams, Urbandale, IA (US); Kevin Eugene Thompson, West Des Moines, IA (US)

(73) Assignee: Rolls-Royce plc (GB)

( * ) Notice: Subject to any disclaimer, the term of this patent is extended or adjusted under 35 U.S.C. 154(b) by 1962 days.

(21) Appl. No.: 12/500,649

(22) Filed: Jul. 10, 2009

(65) Prior Publication Data
US 2011/0005232 A1    Jan. 13, 2011

(51) Int. Cl.
*F02C 7/22* (2006.01)
*F23C 7/00* (2006.01)
*F23R 3/14* (2006.01)

(52) U.S. Cl.
CPC ............. *F02C 7/22* (2013.01); *F23C 7/004* (2013.01); *F23R 3/14* (2013.01); *F05D 2240/128* (2013.01); *F05D 2250/70* (2013.01)

(58) Field of Classification Search
USPC .................................. 60/737, 740, 742, 748
See application file for complete search history.

(56) References Cited

U.S. PATENT DOCUMENTS

| | | | |
|---|---|---|---|
| 3,741,483 A * | 6/1973 | Kawaguchi ................... | 239/400 |
| 5,161,946 A | 11/1992 | Bortz et al. | |
| 6,141,967 A * | 11/2000 | Angel et al. ................... | 60/737 |
| 6,301,900 B1 * | 10/2001 | Mandai et al. ................ | 60/740 |
| 6,560,964 B2 | 5/2003 | Steinhorsson et al. | |
| 6,880,340 B2 * | 4/2005 | Saitoh ............................ | 60/737 |
| 6,883,332 B2 | 4/2005 | Steinhorsson et al. | |
| 6,901,756 B2 * | 6/2005 | Gerendas et al. .............. | 60/740 |

OTHER PUBLICATIONS

UK Intellectual Property Office Search Report dated Aug. 20, 2010.
U.S. Appl. No. 12/378,654, Not yet published, Williams, et al.

* cited by examiner

*Primary Examiner* — Arun Goyal
(74) *Attorney, Agent, or Firm* — Barnes & Thornburg LLP (57) ABSTRACT

A fuel nozzle for a gas turbine engine includes a nozzle body having a longitudinal axis. An elongated annular air passage is defined within the nozzle body. A plurality of circumferentially spaced apart axially extending swirl vanes is disposed within the annular air passage. Each swirl vane has an axially swept cross-sectional profile along the radial extent thereof.

12 Claims, 9 Drawing Sheets

Airflow

AERODYNAMIC SWEPT VANES FOR FUEL INJECTORS

BACKGROUND OF THE INVENTION

1. Field of the Invention

The subject invention is directed to fuel nozzles for gas turbine engines, and more particularly, to air swirlers for fuel nozzles having aerodynamically shaped swept swirl vanes for efficiently turning the air flow passing through the swirler while minimizing the risk of separation.

2. Description of Related Art

In an air blast fuel nozzle for a gas turbine engine, compressor discharge air is used to atomize liquid fuel. More particularly, the air provides a mechanism to break up a fuel sheet into a finely dispersed spray that is introduced into the combustion chamber of an engine. Quite often the air is directed through a duct that serves to turn or impart swirl to the air. This swirling air flow acts to stabilize the combustion reaction.

There are many ways to develop swirl in a fuel nozzle. Historically, helical vanes were used because of their ability to effectively turn the air flow. These vanes generated acceptable air flow characteristics for many engine applications. However, when a higher swirl factor was desired for certain engine applications, there was a tendency for the air flow to separate from the helical vanes. This was generally associated with a reduction in the effectiveness of the geometric flow area of the nozzle.

To mitigate separation, vanes were designed with multiple joined leads that could aid in turning the air flow. These vanes were typically associated with a higher effectiveness of the geometric flow area of the nozzle. Such improvements resulted in a more effective use of the air velocity for atomization.

Air swirlers have also been developed that employ aerodynamic turning vanes, as described in U.S. Pat. No. 6,460,344 to Steinhorsson et al., the disclosure of which is incorporated herein by reference in its entirety. These airfoil shaped turning vanes impart swirl to the atomizing air flow and provide a substantially uniform velocity profile at the nozzle.

It would be beneficial to provide an air swirler for a fuel nozzle having swirl vanes that incorporate the beneficial aspects of extruded radial vanes while providing more effective flow turning. In so doing, air flow through the swirler could be more efficiently turned while the risk of separation would be diminished.

SUMMARY OF THE INVENTION

The subject invention is directed to a fuel nozzle for a gas turbine engine. The fuel nozzle includes a nozzle body having a longitudinal axis. An elongated annular air passage is defined within the nozzle body. A plurality of circumferentially spaced apart axially extending swirl vanes is disposed within the annular air passage. Each swirl vane has an axially swept cross-sectional profile along the radial extent thereof.

In further accordance with the invention, each swirl vane has a trailing edge on a downstream portion thereof, and a leading edge on an upstream portion thereof. The leading and trailing edges each have a tip portion on a radially outer extent thereof, and a base portion on a radially inner extent thereof. In certain embodiments, at least one of the leading edge and the trailing edge is axially swept. At least one of the leading edge and the trailing edge can be swept with the tip portion thereof axially upstream or downstream relative to the base portion thereof. The trailing edge and leading edge of each swirl vane can be swept in opposite relative upstream-downstream directions axially, or in a common relative direction axially. It is also contemplated that the trailing edge can be parallel to the leading edge, if both edges are swept in a common direction. At least one swept edge of each swirl vane can be straight or curved, and can be continuous or can have one or more discontinuities.

It is possible for only one of the leading and trailing edges of each swirl vane to be swept. In certain embodiments, the leading edge is substantially perpendicular to the longitudinal axis, and the trailing edge is swept with the tip portion thereof axially downstream relative to the base portion thereof. The cross-sectional profile of each swirl vane can have a variable thickness along an axial length thereof. The cross-sectional profile of each swirl vane can have proportions that vary along the radial extent of the swirl vane. Each swirl vane can have a cross-sectional profile defined by a first NACA number at a radial tip thereof and defined by a second NACA number at a base thereof. The cross-sectional profile of each swirl vane can be airfoil shaped and can have a chord that varies in length along the radial extent of the swirl vane.

The invention also provides an air swirler for a fuel nozzle. The air swirler includes an inner hub defining a longitudinal axis. A plurality of circumferentially spaced apart axially extending airfoil shaped swirl vanes are provided extending radially outwardly from the hub. The airfoil shape of each swirl vane has a chord that varies in length along the radial extent of the swirl vane.

A fuel nozzle for a gas turbine engine is also provided in accordance with the invention. The fuel nozzle includes a nozzle body having a longitudinal axis and an inner hub aligned with the longitudinal axis within the nozzle body. The nozzle body and inner hub define an annular air passage. The fuel nozzle also includes a plurality of circumferentially spaced apart axially extending aerodynamic swirl vanes extending radially outwardly from the hub in the annular air passage. Each swirl vane has a chord that varies along the radial extent of the swirl vane.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the air swirlers of the subject invention without undue experimentation, preferred embodiments thereof will be described in detail herein below with reference to certain figures, wherein.

DETAILED DESCRIPTION OF THE PREFERRED EMBODIMENTS

Figure 1:
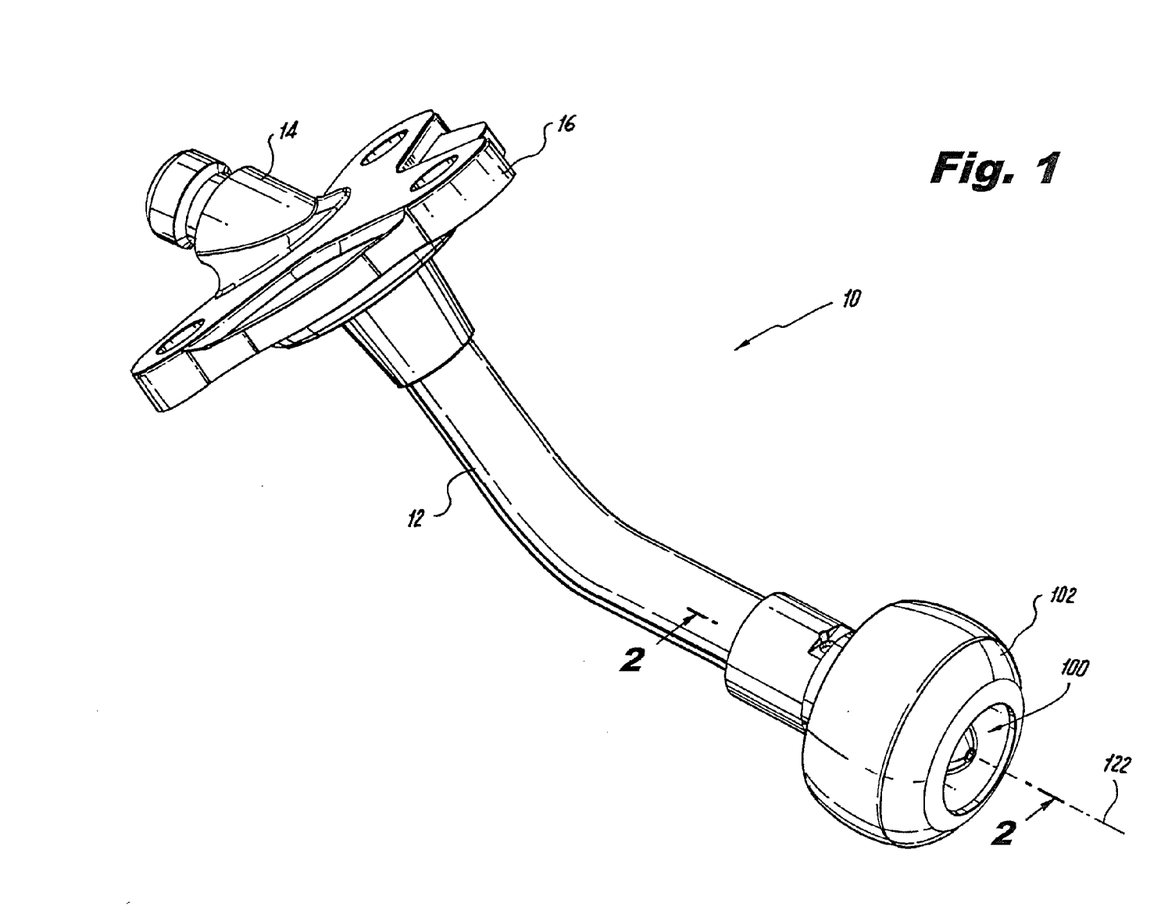
FIG. 1 is a perspective view of a fuel injector, which includes a nozzle assembly having an air swirler with airfoil shaped swept swirl vanes constructed in accordance with an exemplary embodiment of the subject invention.

Reference will now be made to the drawings wherein like reference numerals identify similar structural features or aspects of the subject invention. For purposes of explanation and illustration, and not limitation, a partial view of an exemplary embodiment of a fuel injector in accordance with the invention is shown in FIG. 1 and is designated generally by reference character 10. Other embodiments of fuel injectors and air swirlers in accordance with the invention, or aspects thereof, are provided in FIGS. 2-16, as will be described. The systems of the invention can be used in gas turbine engines, or in any other suitable application, for enhanced swirl efficiency and atomization.

There is illustrated in FIG. 1 a fuel injector 10 for a gas turbine engine. Fuel injector 10 includes an elongated feed arm 12 having an inlet portion 14 for receiving fuel at one end, and a nozzle body 102 at the opposite end of feed arm 12 for issuing atomized fuel into the combustion chamber of a gas turbine engine. A mounting flange 16 is provided proximate to inlet portion 14 for securing fuel injector 10 to the casing of a gas turbine engine.

Figure 2:
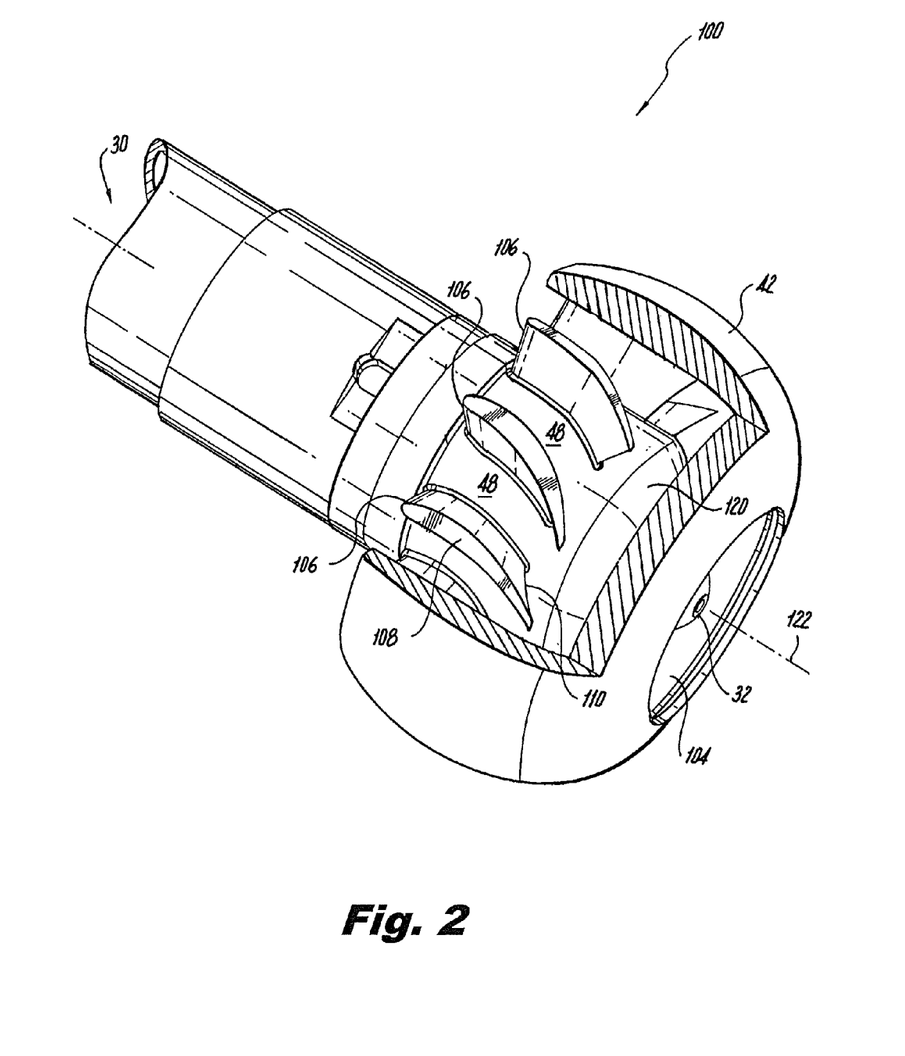
FIG. 2 is an enlarged partially cut away perspective view of the nozzle assembly of FIG. 1, showing the air swirler and spray outlet of the nozzle assembly.

Referring to FIG. 2, nozzle body 102 defines a longitudinal axis 122 and includes, among other things, an on-axis fuel circuit 30 and an outer air swirler 100 located radially outward of fuel circuit 30. The axial fuel circuit 30 issues fuel from an exit orifice 32. Air swirler 100 is bounded by an outer air cap 42 and an inner hub 120, which is aligned with longitudinal axis 122. Air cap 42 of nozzle body 102 and inner hub 120 define an elongated annular air passage 104 therebetween. Air swirler 100 includes a plurality of circumferentially disposed, equidistantly spaced apart aerodynamic swirl vanes 106. Swirl vanes 106 extend radially outwardly from inner hub 120 to air cap 42 within annular air passage 104, forming a plurality of air flow channels 48.

Figure 3:
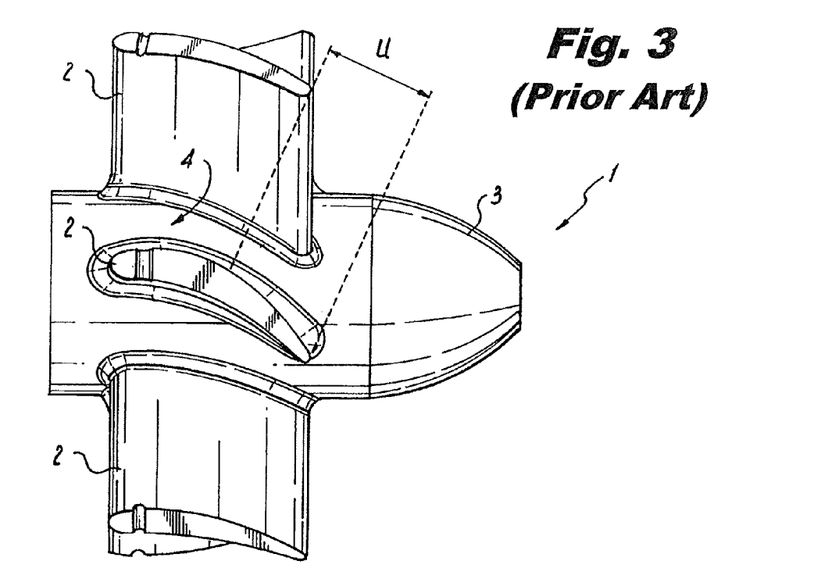
FIG. 3 is side elevation view of a prior art air swirler showing the uncovered portion of a turning vane.
Figure 4:
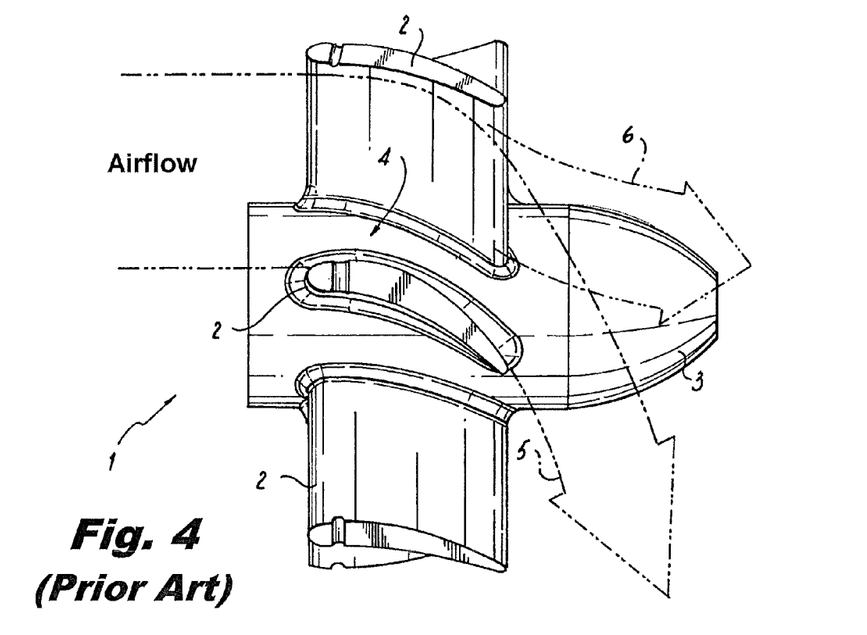
FIG. 4 is a side elevation view of the prior art air swirler of FIG. 3, schematically showing a desired flow field compared to an actual flow field passing through the swirl vanes.

A traditional air swirler 1 is shown in FIGS. 3-4 having extruded aerodynamic turning vanes 2 extending straight outward in a radial direction from a central hub 3. There is an uncovered extent U of each turning vane 2, which is indicated as the area between dotted lines in FIG. 3. Two adjacent vanes 2 form a channel 4 therebetween. The dotted lines in FIG. 3 represent warped surfaces that are generally perpendicular to the flow through channel 4. Any portion of channel 4 between two adjacent vanes 2 where such a surface can be drawn that intersects both vanes 2 is considered a covered portion of channel 4. Any portion in which a surface perpendicular to the flow through channel 4 intersects only one vane 2 is considered an uncovered portion of channel 4.

The uncovered portion of channel 4 is represented by reference character U in FIG. 3. Uncovered portions between turning vanes generally equate to portions of the flow where the flow is not constrained to conform to the vanes. Designs utilizing traditional vanes such as vanes 2 in FIG. 3 are limited in their ability to swirl air flows efficiently since there is nothing forcing flow through uncovered swirler portions along a desired flow field. This leads to flow separation and a reduction in effective flow area and discharge coefficient and loss in intended airflow angle. Flow separation and reduction of effective flow area tend to reduce efficiency and increase the pressure drop and/or camber needed to achieve a given amount of swirl.

To demonstrate this, traditional swirler 1 is shown in FIG. 4 with a schematic representation of a desirable flow field 5 and an actual flow field 6. Those skilled in the art will recognize that flow fields 5, 6 as shown in FIG. 4 are schematic only and are not intended to be considered precise depictions of real flow patterns. Flow field 5 represents a desirable flow with a high degree of swirl imparted. Flow field 6 depicts a flow with less swirl achieved, as is expected when flow separation leads to the inefficiencies described above. In practice the flow through channel 4 in swirler 1 will tend to imitate flow 6 because the uncovered portions of channel 4 allow the flow to depart from a more desirable path such as flow field 5. The limited amount of coverage provided between vanes 2 in traditional swirler 1 limits its ability to more closely achieve the desirable flow field 5. This demonstrates the notion that coverage can be a limiting factor in the efficiency of a swirler.

Figure 5:
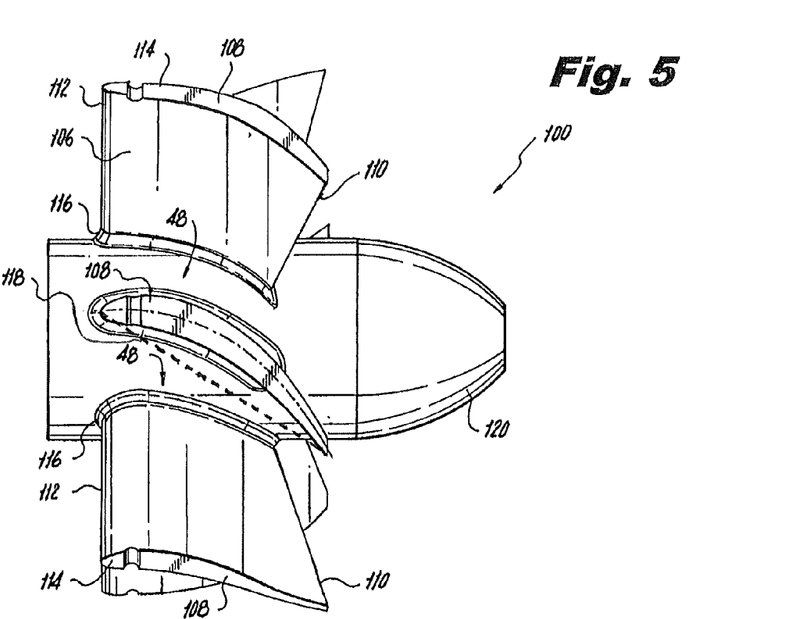
FIG. 5 is a side elevation view of an exemplary embodiment of an air swirler constructed in accordance with the present invention, showing swirl vanes with swept trailing edges.

Referring now to FIG. 5, each swirl vane 106 of swirler 100 constructed in accordance with the invention has a trailing edge 110 on a downstream portion thereof, and a leading edge 112 on an upstream portion thereof. The trailing and leading edges 110, 112 each have a tip portion 114 on a radially outer extent thereof, and a base portion 116 on a radially inner extent thereof.

Swirl vanes 106 of swirler 100 are aerodynamic with airfoil shaped cross-sectional profiles 108. Each swirl vane 106 has an axially swept cross-sectional profile 108 along the radial extent thereof. The airfoil shape of each swirl vane 106 has a chord 118 that varies in length along the radial extent of the respective swirl vane 106. This variation in chord length is a result of trailing edge 110 being swept in the downstream direction toward the radially outer tip portion 114 thereof. Chord 118 increases in length over the radial distance from base portion 116 of each swirl vane 106 to tip portion 114. Cross-sectional profile 108 of each swirl vane 106 has a variable thickness along an axial length thereof, resulting in the airfoil shape.

Figure 6:
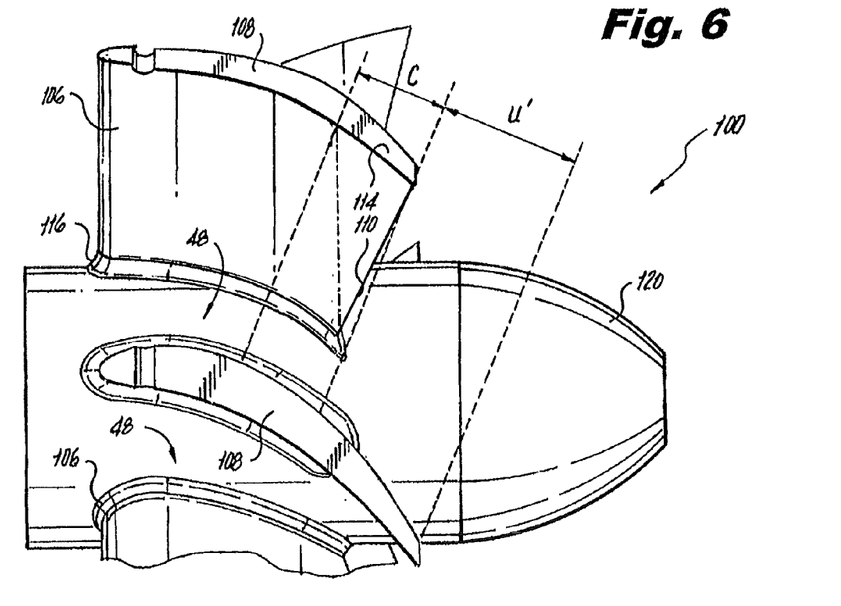
FIG. 6 is an enlarged elevation view of a portion of the air swirler of FIG. 5, schematically showing the increased coverage between swirl vanes provided by the swept portions thereof.
Figure 7:
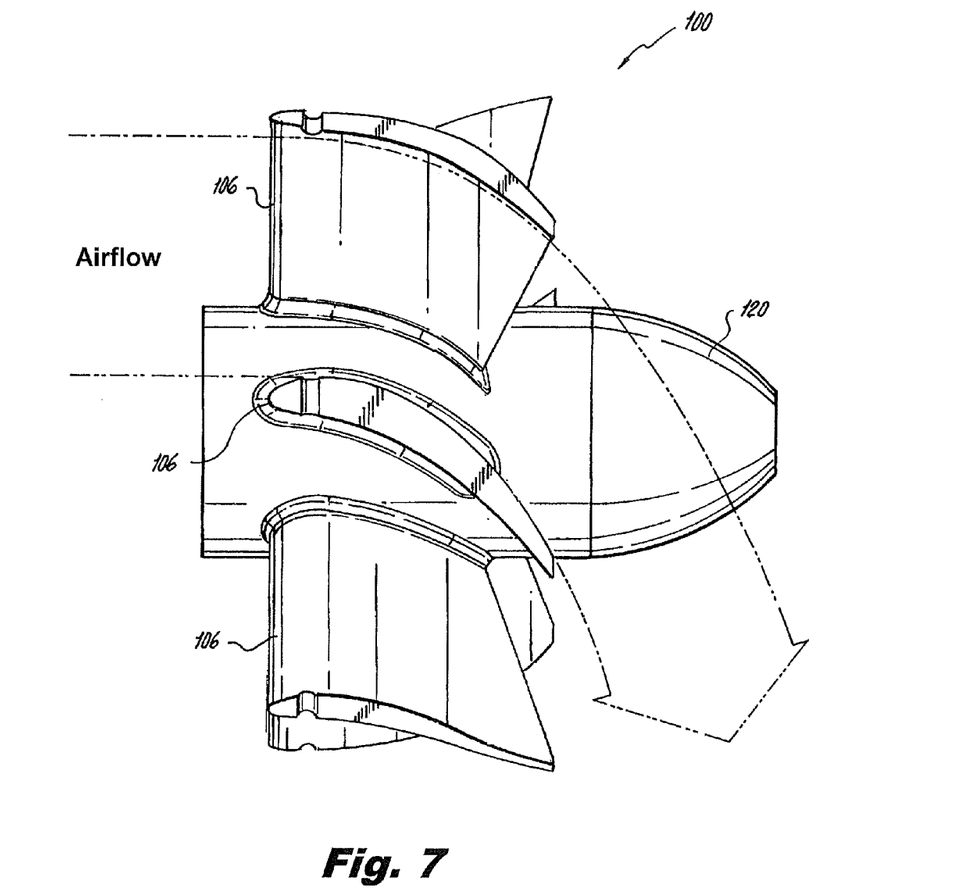
FIG. 7 is a side elevation view of the air swirler of FIG. 5, schematically showing a desired flow field passing through the swirl vanes.
Figure 8:
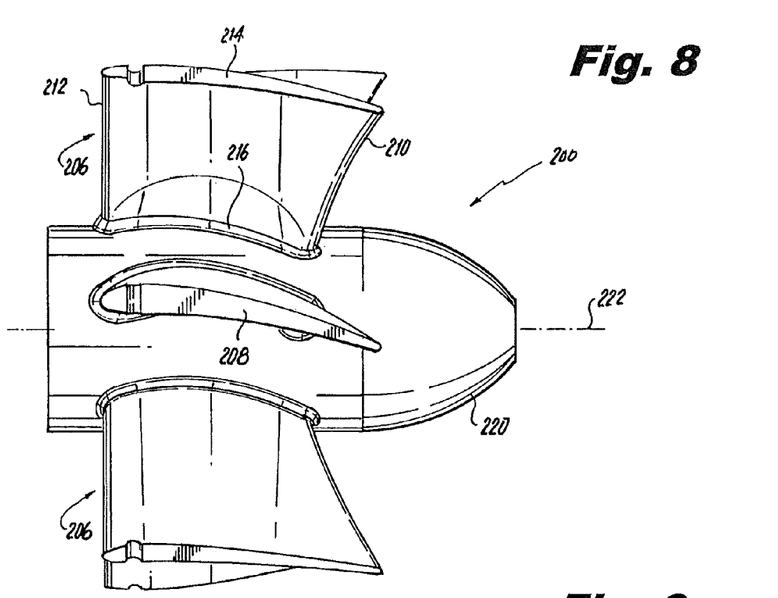
FIG. 8 is a side elevation view of another exemplary embodiment of an air swirler constructed in accordance with the present invention, showing swirl vanes with an airfoil shape that varies along the radial extent of each swirl vane.
Figure 9:
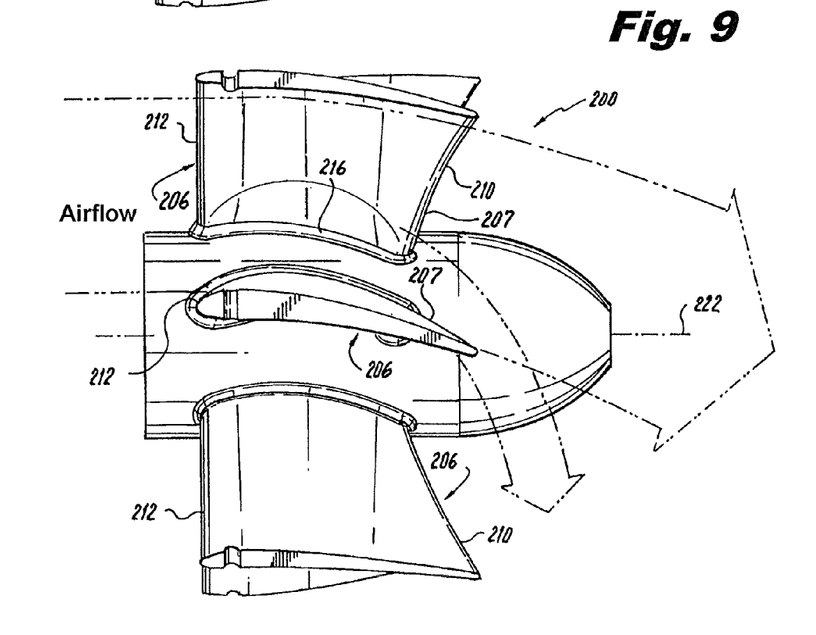
FIG. 9 is a side elevation view of the air swirler of FIG. 8, schematically showing the desired flow field passing through the swirl vanes.
Figure 10:
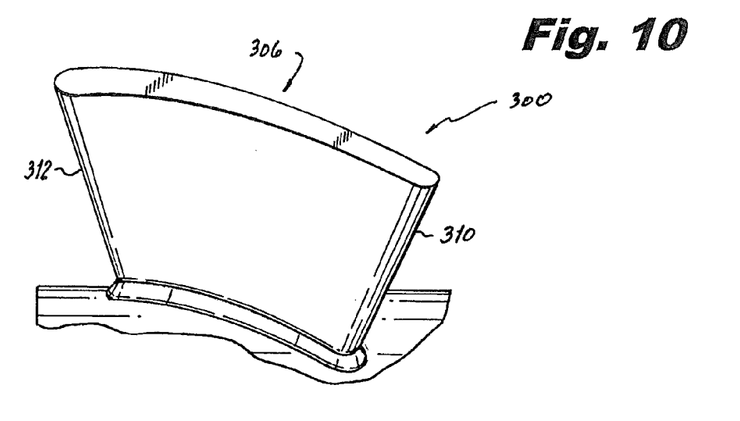
FIGS. 10-16 show perspective views of portions of further exemplary embodiments of air swirlers constructed in accordance with the present invention, each showing an air swirler having swirl vanes with a different sweep configuration on the leading and trailing edges.
Figure 11:
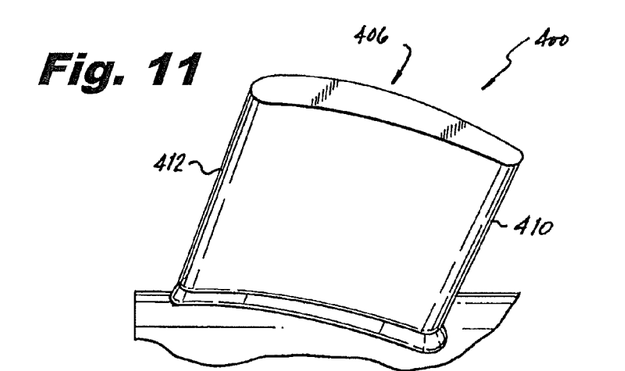
Figure 12:
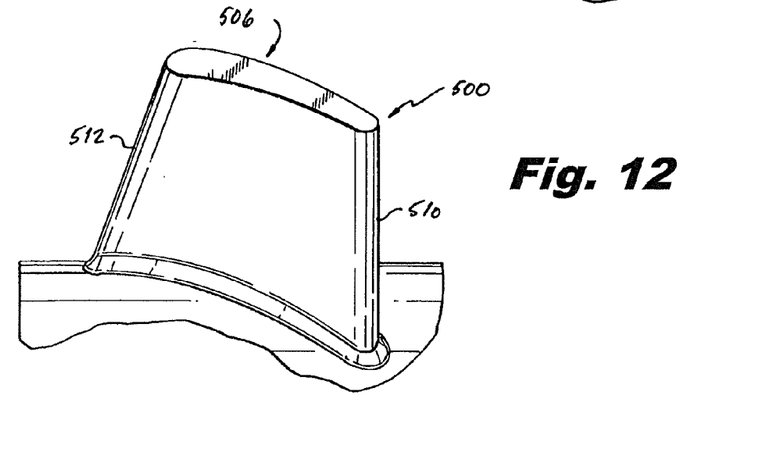
Figure 13:
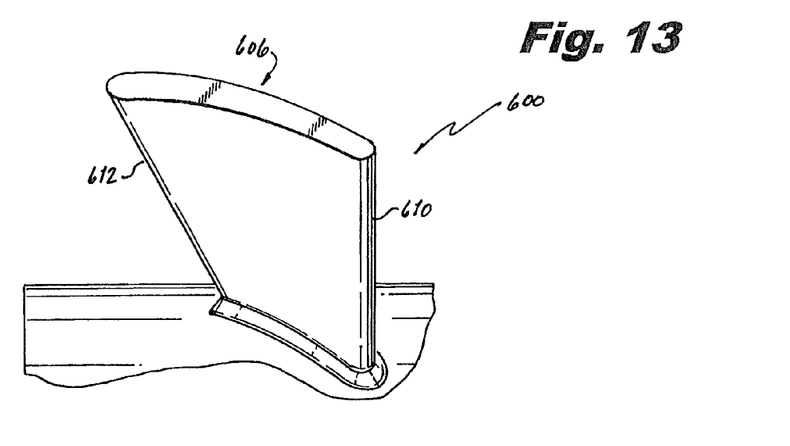
Figure 14:
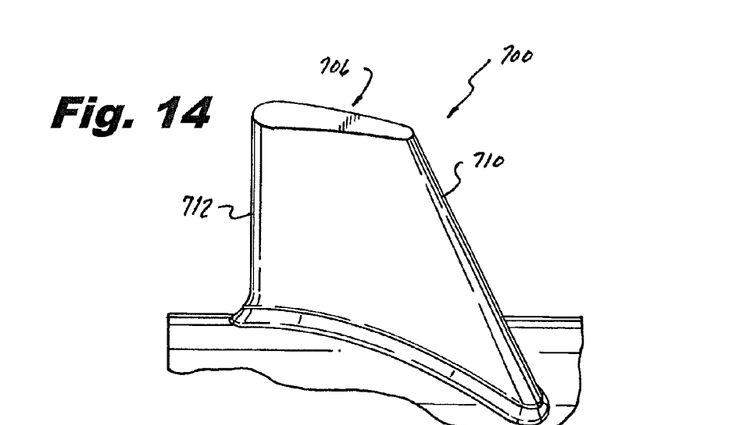
Figure 15:
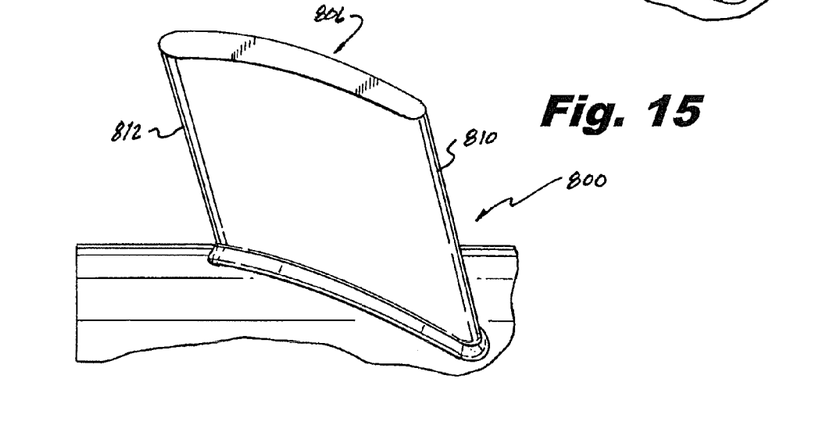
Figure 16:
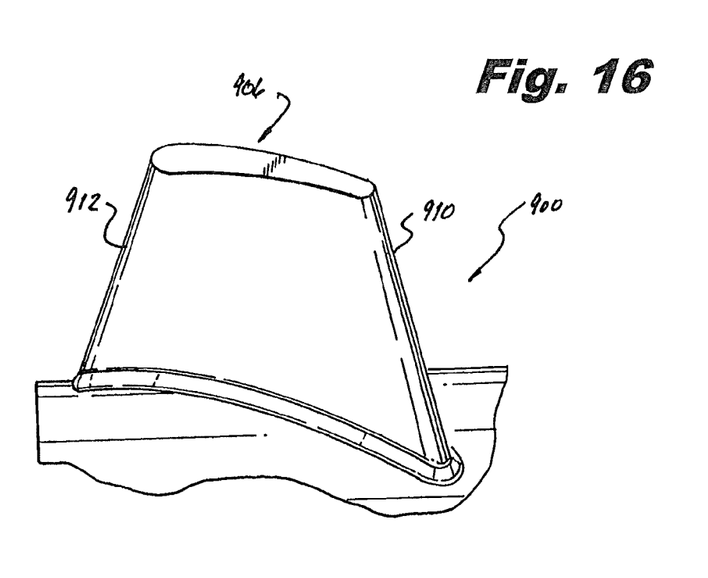

The swept profile of swirl vanes 106 increases the coverage of each air flow channel 48 and hence enhances the efficiency of swirler 100. A comparison of swirler 100 in FIG. 6 and traditional swirler 1 in FIG. 3 demonstrates the increased coverage provided by swept swirl vanes 106. In FIG. 6, the uncovered portion of channel 48 at tip portion 114 is schematically indicated by the distance U', which can be compared with uncovered portion U in FIG. 3. Since trailing edge 110 is swept, there is an increased amount of coverage C at tip portion 114 as indicated in FIG. 6. When compared with uncovered area U in traditional swirler 1, uncovered area U' in swirler 100 is reduced by an amount equal to covered area C.

It should be noted that the amount of increased coverage C varies along the radial extent of swirl vanes 106, being small near base portion 116 and increasing toward tip portion 114. The actual area of increased coverage C is thus a generally wedge shaped volume that is broadest at tip portion 114. Because of the annular geometry of air passage 104, the greatest flow volume is nearest tip portion 114, which corresponds to the area of greatest increase in coverage. This arrangement significantly increases the overall coverage within the swirled flow, helping swirler 100 more closely approach a desired flow pattern, as indicated schematically by the large arrow in FIG. 7.

In this way, swept swirl vanes 106 enhance swirler efficiency significantly compared to non-swept configurations of comparable dimensions. The increased coverage provided by swept vanes mitigates flow separation and provides a higher effective flow area and discharge coefficient. A notable benefit of a reduction in flow loss is the ability to more effectively use the air velocity for atomization, requiring less pressure drop to accomplish the desired turning of a flow.

It is not necessary for leading and trailing edges of swept swirl vanes to be defined by straight edges. They can be curved, continuous, discontinuous, or of any other suitable shape. FIG. 8 shows an example of an embodiment of a swirler 200 with swirl vanes 206 having swept trailing edges 210 that are curved instead of straight. Those skilled in the art will appreciate that different shapes can be used for leading and trailing edges as needed for particular applications. Any suitable swirl angle can be used on swirl vanes as well without departing from the spirit and scope of the invention.

Swirler 200, shown in FIGS. 8-9, has a smaller camber at the tip compared to traditional swirler 1 in FIG. 4. Comparison of the large schematic arrows in FIGS. 4 and 9 shows that swirler 200 can achieve a comparable amount of swirl to that indicated by the actual flow field 6 of traditional swirler 1 but with a reduced swirl angle and camber. The ability to accomplish a greater degree of swirl with less camber is possible because of the increased flow efficiency provided by swept vanes 206, as described above.

With continued reference to FIGS. 8-9, cross-sectional profile 208 of each swirl vane 206 can have proportions that vary along the radial extent of swirl vane 206. For example, in swirler 200, swirl vanes 206 each have a first airfoil shape at base portions 216 that transitions along the radial direction into a second airfoil shape at their tip portions 214, similar to the principles of swept wing theory. In FIG. 9, the large arrow schematically indicates a portion of the flow field at the tip region and the thin arrow schematically indicates a portion of the flow field at the base region. The flow field at the base region has a greater degree of swirl than at the tip region due to the greater camber at the base region compared to the tip region.

It is envisioned and well within the scope of the subject disclosure that the airfoil geometry of the turning vanes of air swirlers with swept vanes can be defined using the National Advisory Committee for Aeronautics (NACA) 4-digit definitions, 5-digit definitions, or the modified 4-/5-digit definitions. In each case, the airfoil shape is generated using analytical equations that describe the camber (curvature) of the mean line (geometric centerline) of the airfoil section, as well as the thickness or width distribution along the length of the airfoil. For example, it is possible to construct a swirler in accordance with the present invention in which each swirl vane has a cross-sectional profile defined at the tip by a NACA 2312 airfoil and at the hub or base by a NACA 2412 airfoil, with a smooth transition between the two NACA airfoils along the radial extent of each swirl vane. Those skilled in the art will readily appreciate that any suitable cross-sectional profiles can be used, whether standard or non-standard, without departing from the spirit and scope of the invention.

In swirlers 100, 200, the swirl vanes 106, 206 have leading edges 112, 212 substantially perpendicular to the longitudinal axis 122, 222 of the respective hub 120, 220, and trailing edges 110, 210 that are swept downstream toward tip portions 114, 214. However, it is also possible for the leading edges of swirl vanes to be swept instead or in addition to the trailing edges being swept. Moreover, the leading or trailing edges can be swept upstream or downstream as needed. In short, it is contemplated that any combination of sweep can be used for the leading and trailing edges of swirl vanes without departing from the spirit and scope of the invention.

To illustrate such combinations, FIGS. 10-16 show exemplary embodiments in which different sweeping configurations are used for the leading and trailing edges. Swirler 300, shown in FIG. 10, has swirl vanes 306 (only one vane is shown for clarity) where trailing edge 310 is swept downstream and leading edge 312 is swept upstream. In swirler 400, both leading edges 412 and trailing edges 410 of vanes 406 are swept downstream, as indicated in FIG. 11. While leading edge 412 is shown parallel to trailing edge 410 in FIG. 11, similar configurations are also contemplated in which the leading and trailing edges are both swept downstream but are non-parallel. An exemplary swirler 500 is shown in FIG. 12 having swirl vanes 506 with leading edges 512 swept downstream and trailing edges 510 perpendicular to the axis of the hub. As shown in FIG. 13, trailing edges 610 of vanes 606 in swirler 600 are also perpendicular to the axis of the hub, however leading edges 612 are swept upstream. Referring to FIG. 14, swirler 700 has vanes 706 with leading edges 712 perpendicular to the hub and trailing edges 710 swept upstream. Swirler 800, depicted in FIG. 15, has vanes 806 with both leading and trailing edges 812 and 810, respectively, swept upstream in parallel to each other. Similar configurations are also contemplated in which both leading and trailing edges are swept upstream but are not parallel to each other. Referring now to FIG. 16, there is shown an exemplary swirler 900 having vanes 906 with leading edges 912 swept downstream and trailing edges 910 swept upstream.

Those skilled in the art will readily appreciate that the sweeping configurations shown and described above can be varied in terms of sweep angle and edge shape for specific applications with specific desired swirl profiles without departing from the spirit and scope of the invention. For example, if more turning is desired at the tip of the vanes, an additional aft sweep can be added to the trailing edge to increase the coverage at the tip. Depending on the application, swirlers in accordance with the invention can be designed to provide a uniform or non-uniform velocity profile as needed. For example, uniform velocity profile from hub to vane tip can help swirl stabilization.

The exemplary swirlers with swept swirl vanes described above can be produced by casting processes since the vane geometry allows for radial pull of molds away from the vanes and/or for axial, twisting pull. Direct laser metal sintering, direct laser deposition, traditional molding, electro discharge machining, or any other suitable manufacturing process can be used in addition to or in lieu of casting. Thus, the swirlers described herein can be manufactured with relative ease.

While described herein in the context of fuel injectors having a single air circuit and a single fuel circuit, those skilled in the art will readily appreciate that swirlers constructed in accordance with the present invention can also be used in injectors or nozzles having any suitable number of air circuits and fuel circuits. For example, while the air swirlers of the subject invention have been shown and described with respect to a particular fuel nozzle design, those skilled in the art will readily appreciate that the novel air swirlers of the subject invention can be employed with a variety of different types of atomizing fuel nozzles. These can include airblast fuel nozzles, dual or multiple air blast nozzles, air-assisted fuel nozzles, simplex or single orifice fuel nozzles, duplex or double orifice fuel nozzles, or piloted airblast fuel nozzles where the air swirler could be used for main fuel atomization, pilot fuel atomization or both. It is also envisioned that the aerodynamically shaped swept turning vanes disclosed herein could be used to efficiently turn fluid or gas passing through a fuel swirler or injector.

The methods and systems of the present invention, as described above and shown in the drawings, provide for swirl vanes with superior properties including increased flow coverage and efficiency, as well as ease of manufacture. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A fuel nozzle for a gas turbine engine comprising:
    a) a nozzle body having a longitudinal axis;
    b) an annular air passage defined within the nozzle body; and
    c) a plurality of circumferentially spaced apart axially extending aerodynamic swirl vanes disposed within the annular air passage, each of the swirl vane having an axially swept cross-sectional profile along the radial extent thereof, wherein the cross-sectional profile of each of the swirl vane has proportions that vary along the radial extent of the swirl vane.

2. A fuel nozzle as recited in claim 1, wherein each of the swirl vane has a trailing edge on a downstream portion thereof, a leading edge on an upstream portion thereof, wherein the leading edge and the trailing each have a tip portion on a radially outer extent thereof, and a base portion on a radially inner extent thereof, and wherein at least one of the leading edge and the trailing edge is axially swept.

3. A fuel nozzle as recited in claim 2, wherein at least one of the leading edge and the trailing edge is swept with the tip portion thereof axially downstream relative to the base portion thereof.

4. A fuel nozzle as recited in claim 2, wherein at least one of the leading edge and the trailing edge is swept with the tip portion thereof axially upstream relative to the base portion thereof.

5. A fuel nozzle as recited in claim 2, wherein the trailing edge and the leading edge of each of the swirl vane are swept in opposite relative directions axially.

6. A fuel nozzle as recited in claim 2, wherein the trailing edge and the leading edge of each of the swirl vane are swept in a common relative direction axially.

7. A fuel nozzle as recited in claim 2, wherein the at least one swept edge of each of the swirl vane is straight.

8. A fuel nozzle as recited in claim 2, wherein the at least one swept edge of each of the swirl vane is curved.

9. A fuel nozzle as recited in claim 2, wherein the leading edge is substantially perpendicular to the longitudinal axis, and wherein the trailing edge is swept with the tip portion thereof axially downstream relative to the base portion thereof.

10. A fuel nozzle as recited in claim 2, wherein the trailing edge is parallel to the leading edge.

11. A fuel nozzle as recited in claim 1, wherein the cross-sectional profile of each of the swirl vane has a variable thickness along an axial length thereof.

12. A fuel nozzle as recited in claim 1, wherein the cross-sectional profile of each of the swirl vane is airfoil shaped and has a chord that varies in length along the radial extent of the swirl vane.

* * * * *